United States Patent [19]
McLaughlin

[11] Patent Number: 6,099,014
[45] Date of Patent: Aug. 8, 2000

[54] BOAT STOP

[76] Inventor: Norman L. McLaughlin, 704 W. Mission Ave., Bellevue, Nebr. 68005

[21] Appl. No.: 09/149,421

[22] Filed: Sep. 8, 1998

[51] Int. Cl.$^7$ ....................................................... B60P 3/10
[52] U.S. Cl. .......................................................... 280/414.1
[58] Field of Search ............................ 280/414.1, 414.2, 280/414.3

[56] References Cited

U.S. PATENT DOCUMENTS

| | | | |
|---|---|---|---|
| D. 368,053 | 3/1996 | Gallagher | D12/101 |
| 2,787,476 | 4/1957 | Holsclaw | 280/179 |
| 2,827,304 | 3/1958 | Backus | 280/143 |
| 3,025,985 | 3/1962 | Crawford | 214/505 |
| 3,072,376 | 1/1963 | Bhend | 248/361 |
| 3,113,686 | 12/1963 | Sundin | 280/414.1 |
| 3,175,710 | 3/1965 | Kistner | 280/414.1 |
| 3,837,509 | 9/1974 | Gladnick | 214/84 |
| 4,093,266 | 6/1978 | Baxter | 280/491 R |
| 4,331,431 | 5/1982 | Estes | 440/53 |
| 4,463,965 | 8/1984 | Lawson | 280/414.1 |
| 4,464,092 | 8/1984 | Chambers et al. | 414/534 |
| 4,560,316 | 12/1985 | Daniels | 414/481 |
| 4,826,200 | 5/1989 | Tingley | 280/414.1 |
| 4,946,332 | 8/1990 | Daniels | 280/414.1 |
| 5,072,959 | 12/1991 | Marullo | 280/47.331 |
| 5,193,835 | 3/1993 | Sheets | 280/414.1 |
| 5,259,647 | 11/1993 | Sanden | 280/789 |

*Primary Examiner*—Kevin Hurley
*Attorney, Agent, or Firm*—Zarley, McKee, Thomte, Voorhees & Sease; Dennis L. Thomte

[57] ABSTRACT

A boat stop is provided for a trailer which is designed to support a boat thereon. The boat stop is secured to either the roller bunk on the trailer or on the frame of the trailer, with the boat stop being positioned behind the lower end of the transom of the boat when the boat is supported on the trailer.

11 Claims, 5 Drawing Sheets

BOAT STOP

BACKGROUND OF THE INVENTION

1. Technical Field

This invention relates to a boat stop for preventing a boat from accidentally rolling off the trailer during boat launching and which also serves as a launching aid.

2. Description of the Related Art

Boat trailers have been used for many years for transporting boats from one location to another. The conventional boat trailers normally include a wheeled frame means having a boat support means positioned thereon for supporting the hull of the boat. The forward end of the boat normally has an eye bolt secured to the forward end thereof which is adapted to receive one end of a winch cable to enable the boat to be winched onto the trailer so that the bow of the boat engages a boat stop secured to the forward end of the trailer to limit the forward movement of the boat on the trailer. In many cases, a safety chain extends from the trailer or the forward boat stop to the eye bolt for ensuring that the boat will not drop from the trailer if the winch or winch cable should fail.

When the boat is to be launched, the trailer is normally backed into the water with the boat thereon and the boater normally does not disconnect the safety chain or the winch cable from the eye bolt at the front of the boat until the boat has floated free from the trailer. However, in the event of a mechanical problem with the trailer winch, winch cable or safety chain, or an error on the part of the individual launching the boat, i.e., not having the anti-reversal lever engaged on the winch or having the winch cable unhooked intentionally or unintentionally, the boat can roll rearwardly with respect to the boat trailer, prior to the boat being in the water, which can cause severe damage to the boat or the drive unit when the boat or drive unit strikes the boat ramp.

SUMMARY OF THE INVENTION

A boat stop is provided for boat trailers to prevent the boat from accidentally rolling off the trailer during boat launching and which also serves as a launching aid.

The boat stop is attached to the rear of the boat trailer or to the roller bunks and when the boat is loaded on the trailer, the boat stop extends upwardly from the bottom of the hull and behind the transom of the boat approximately two inches to four inches. In one form of the invention, the boat stop is comprised of a pair of upstanding boat stops which are secured to the trailer frame and have a roller at the upper forward end thereof. In another form of the invention, the boat stops have a bumper-like cushion at the upper ends thereof. In yet another embodiment, the boat stops are secured to the rear end of the roller bunks.

In the event of a mechanical problem with the trailer winch, winch cable or safety chain, or an error on the part of the individual launching the boat, the boat stops prevent the boat from rolling off the trailer while the trailer is being backed down the ramp by physically stopping the rearward movement of the boat. As the trailer and boat are backed down the ramp and into the water to launch, the rear of the boat enters the water first, and once in adequately deep water, the boat floats over the boat stops and into the water.

To retrieve the boat, the boat trailer is backed into the water to an adequate depth. The boat is powered onto the trailer, and the winch cable is attached to the eye bolt at the front of the boat. Once attached, the boat is winched onto the trailer until the boat is tightly against the forward boat stop on the trailer. The trailer and boat are then pulled up the ramp and out of the water. As the trailer and boat are pulled out of the water, the boat settles into position in front of the rear boat stops. The boat stops also serve as a useful launch aid by allowing the winch cable and safety chain to be unhooked from the bow eye of the boat while launching the boat inasmuch as the boat stops prevent the boat from rolling off the trailer during launching.

It is a principal object of the invention to provide a boat stop for preventing a boat from accidentally rolling off the trailer during boat launching.

Still another object of the invention is to provide boat stops for a boat trailer which serve as a launching aid.

Still another object of the invention is to provide boat stops which extend upwardly behind the lower portion of the transom approximately two inches to four inches.

Still another object of the invention is to provide boat stops for a trailer which may be easily mounted on the trailer without extensive modification thereof.

These and other objects will be obvious to those skilled in the art.

DESCRIPTION OF THE PREFERRED EMBODIMENT

Figure 1:
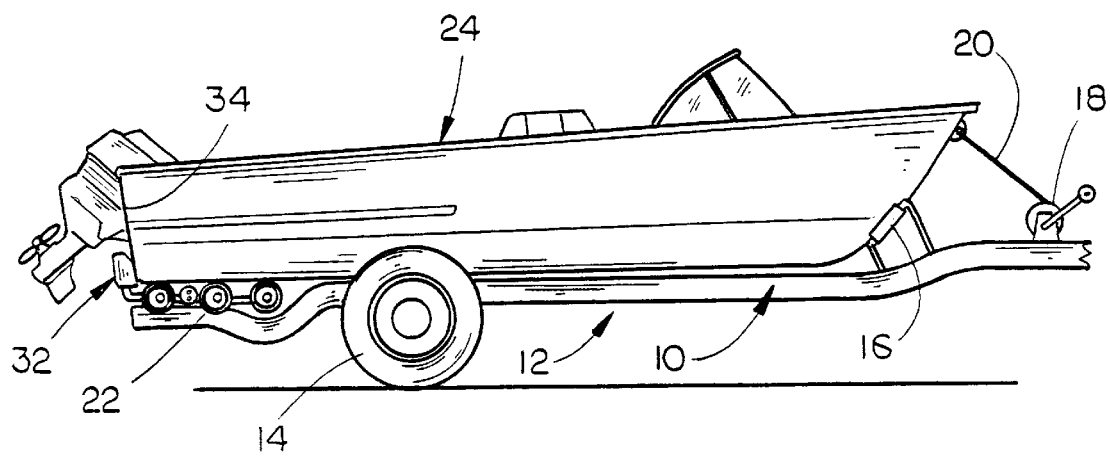
FIG. 1 is a side view of the boat stop of this invention mounted on roller bunks.

The numeral 10 refers to a conventional boat trailer including a frame means 12 which normally consists of a pair of longitudinally extending frame members supported upon wheels 14. Trailer 10 includes a bow stop 16 and a winch 18 having a winch cable 20 extending therefrom. The numeral 22 refers to a conventional roller bunk which is provided on each of the frame members of the frame 12 for supporting the underside or hull of the boat 24 when the boat 24 is mounted on the trailer 10.

Figure 2A:
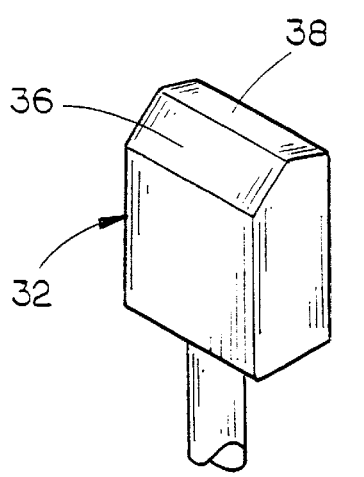
FIG. 2A is a perspective view of a modified form of the boat stop.
Figure 2B:
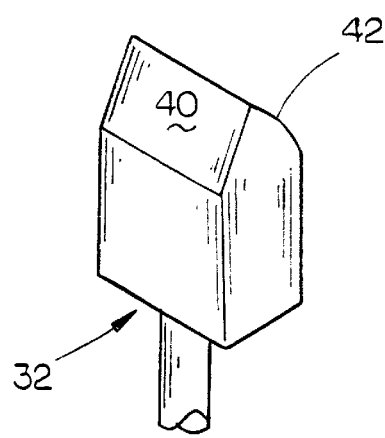
FIG. 2B is yet another modified form of the boat stop.
Figure 2C:
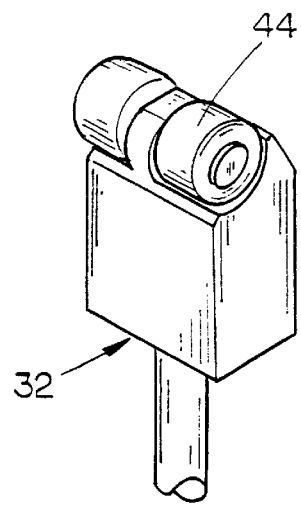
FIG. 2C is yet another modified form of the boat stop.
Figure 3:
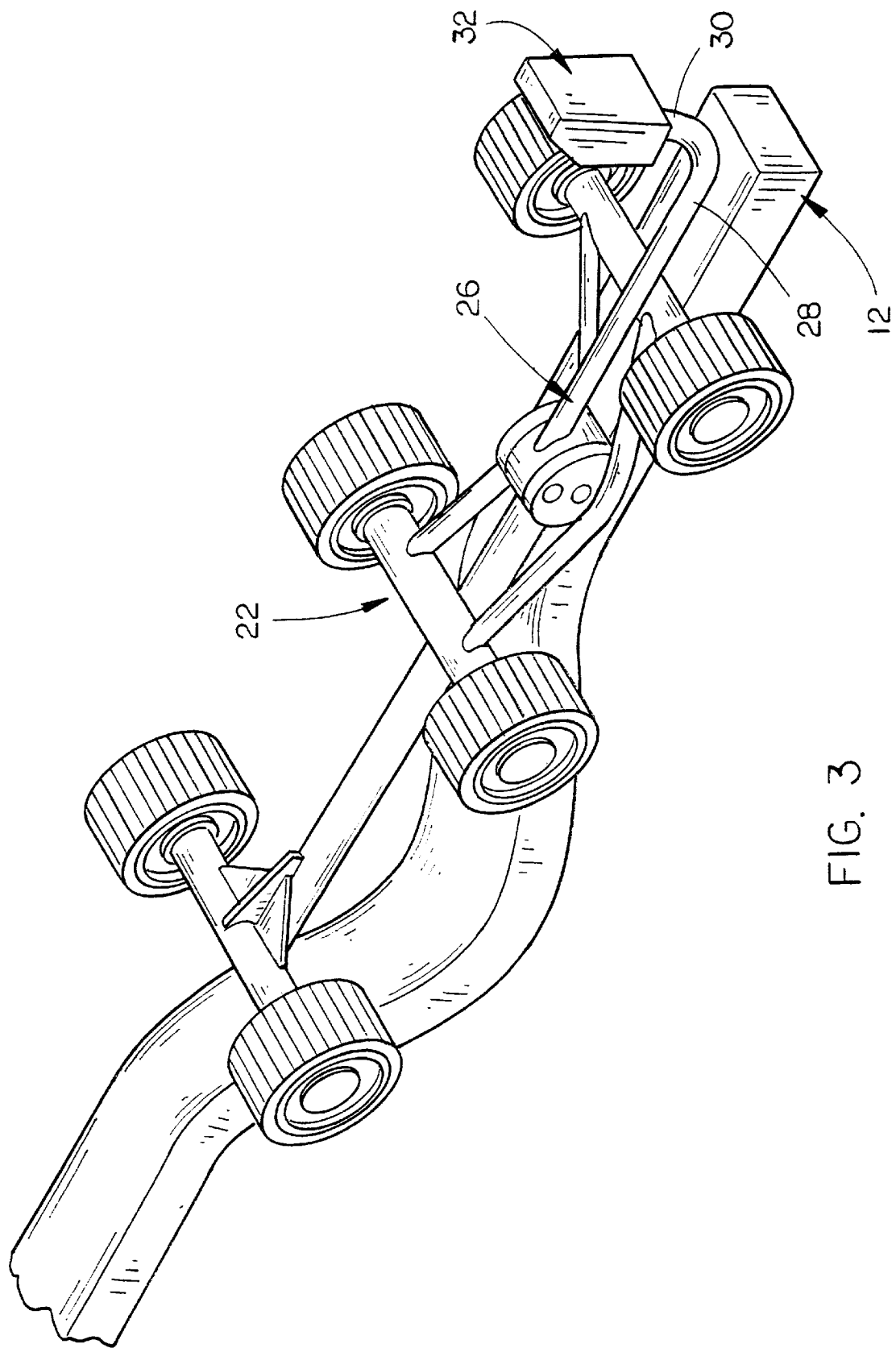
FIG. 3 is a perspective view illustrating the boat stop secured to a roller bunk.

One form of the boat stop is illustrated best in FIG. 3 and is referred to generally by the reference numeral 26. Boat stop 26 includes an elongated rod member 28 which extends substantially horizontally rearwardly from the roller bunk and which terminates in an upstanding portion 30 which has a boat stop member 32 mounted thereon. The boat stop member 32 may take any of the configurations of FIGS. 2A, 2B and 2C or any other configuration as desired, as long as the boat stop member 32 is positioned rearwardly of the lower portion of the transom 34 of the boat 24. FIG. 2A illustrates that the boat stop member 32 has a pair of beveled surfaces 36 and 38 at its upper end. In FIG. 2B, the boat stop member 32 includes a beveled surface 40 and an arcuate surface 42. In FIG. 2C, boat stop member 32 has a roller means 44 provided at the upper end thereof. Preferably, the boat stop members 32 are comprised of a material which will not damage the boat such as rubber, polyurethane, etc.

Figure 6:
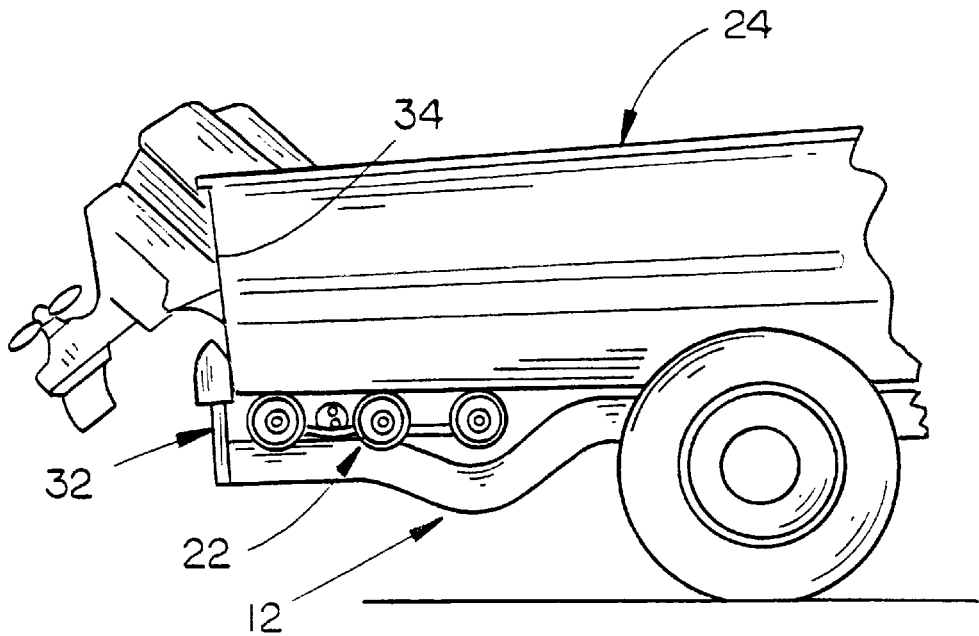
FIG. 6 is a side view illustrating the boat stop being secured to the trailer frame rather than the roller bunk.
Figure 7:
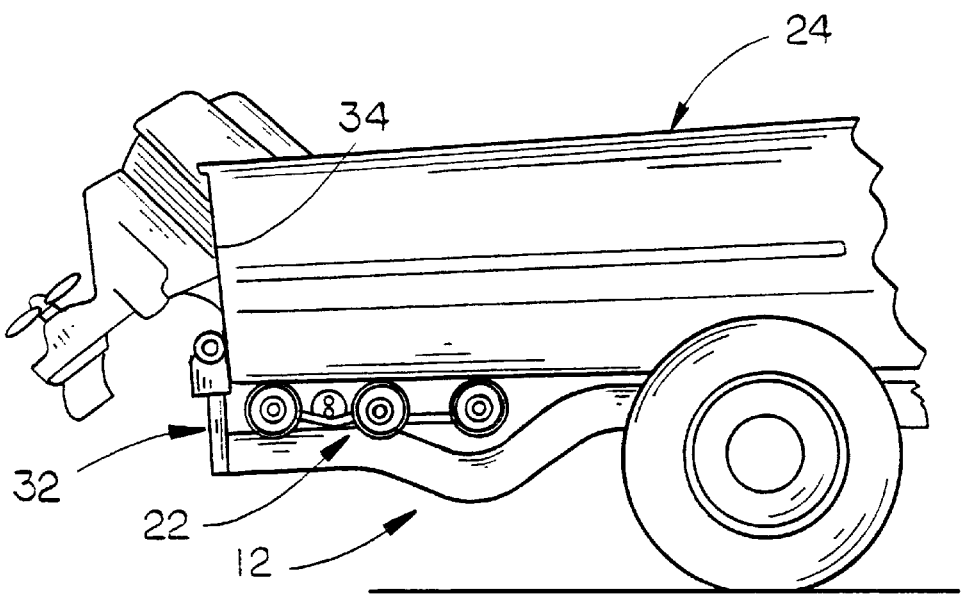
FIG. 7 is a view similar to FIG. 6 except that the embodiment of FIG. 2C is utilized.

FIGS. 6 and 7 illustrate the boat stop member 32 being secured to the frame 12 of the trailer 10. It should be understood that a boat stop member 32 would be secured to each of the frame members of the frame 12. Regardless of whether the boat stop member 32 is secured to the roller bunk or to the trailer frame, it is designed so as to be positioned rearwardly of the lower portion of the transom 34 when the boat 24 is supported upon the trailer 12.

Figure 4:
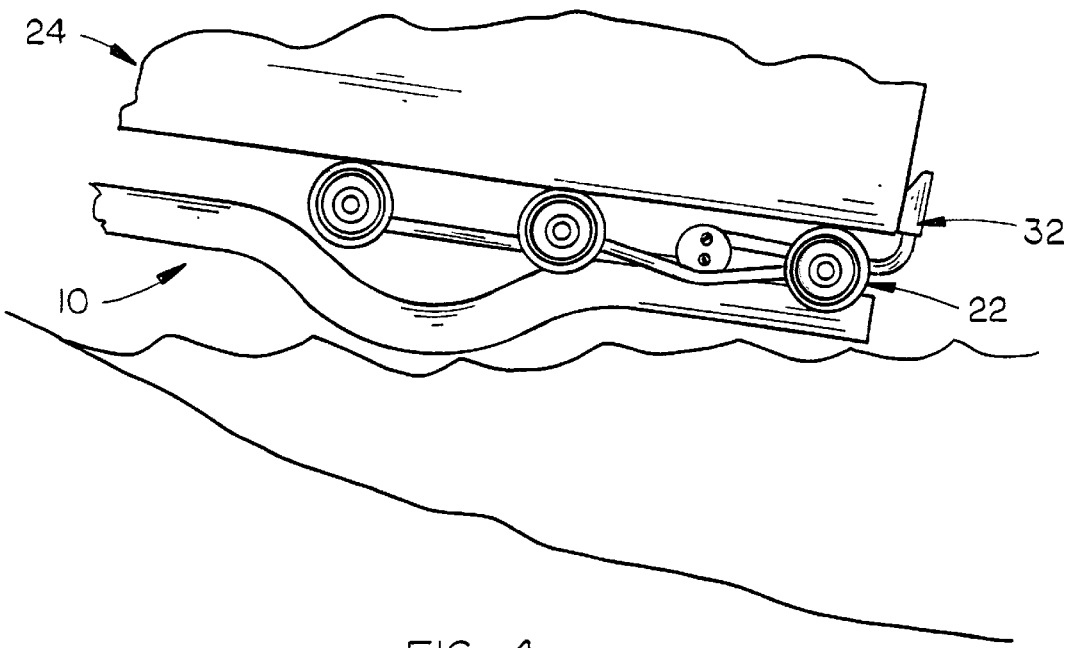
FIG. 4 is a side view illustrating a boat trailer being backed into the water with the boat stop engaging the rear of the boat.
Figure 5:
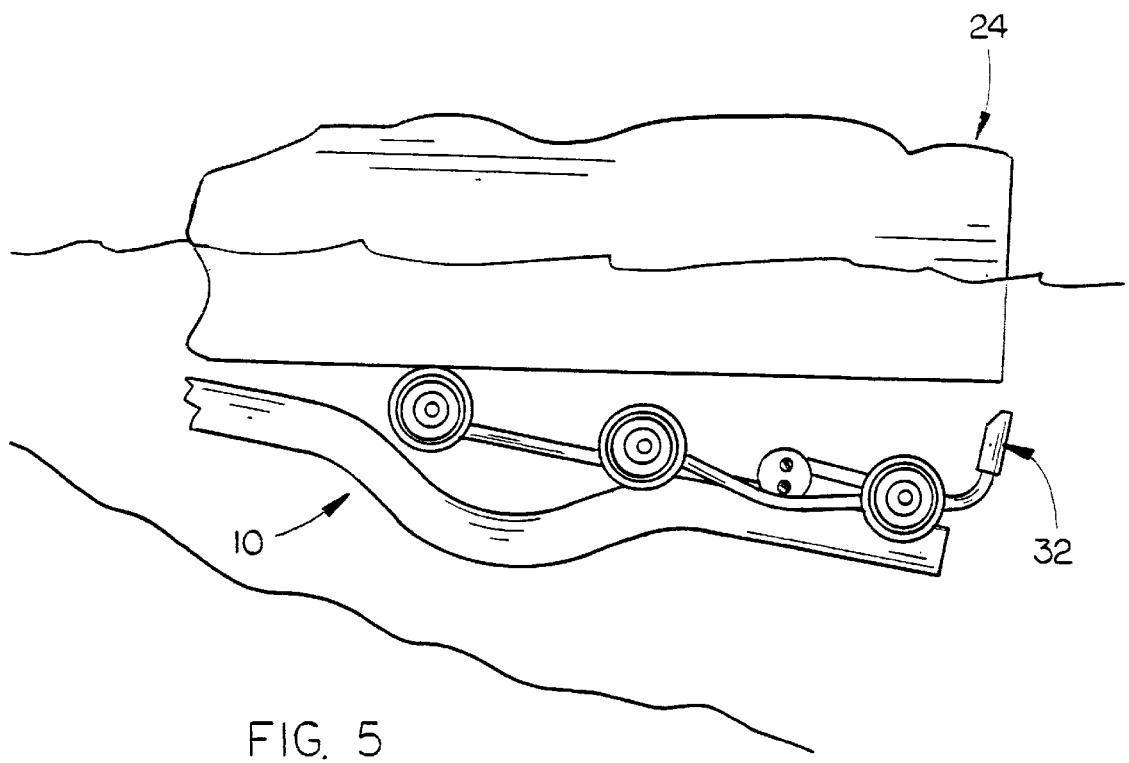
FIG. 5 is a view similar to FIG. 4 except that the trailer has been backed further into the water and the boat has floated out of engagement with the boat stop.

In use, assuming that the boat stop member 32 is secured to each of the roller bunks 22, the boat stop member 32 is positioned rearwardly of the lower portion of the transom 34 and will prevent the boat from rolling from the trailer 10 in the event of a mechanical problem with the trailer winch, winch cable or safety chain, or an error on the part of the individual launching the boat, i.e., not having the anti-reversal lever engaged on the winch or having the winch cable unhooked intentionally or unintentionally. As the trailer 10 is backed into the water, as illustrated in FIG. 4, the boat 24 cannot roll from the trailer. However, when the trailer 10 has been backed into the water to the position as illustrated in FIG. 5, the boat 24 will float out of engagement with the boat stop member 32 so that the boat may be removed from the trailer. In other words, as the trailer and boat are backed down the ramp and into the water to launch, the rear of the boat enters the water first and, once in adequately deep water, the boat floats over the boat stops and into the water.

Figure 8:
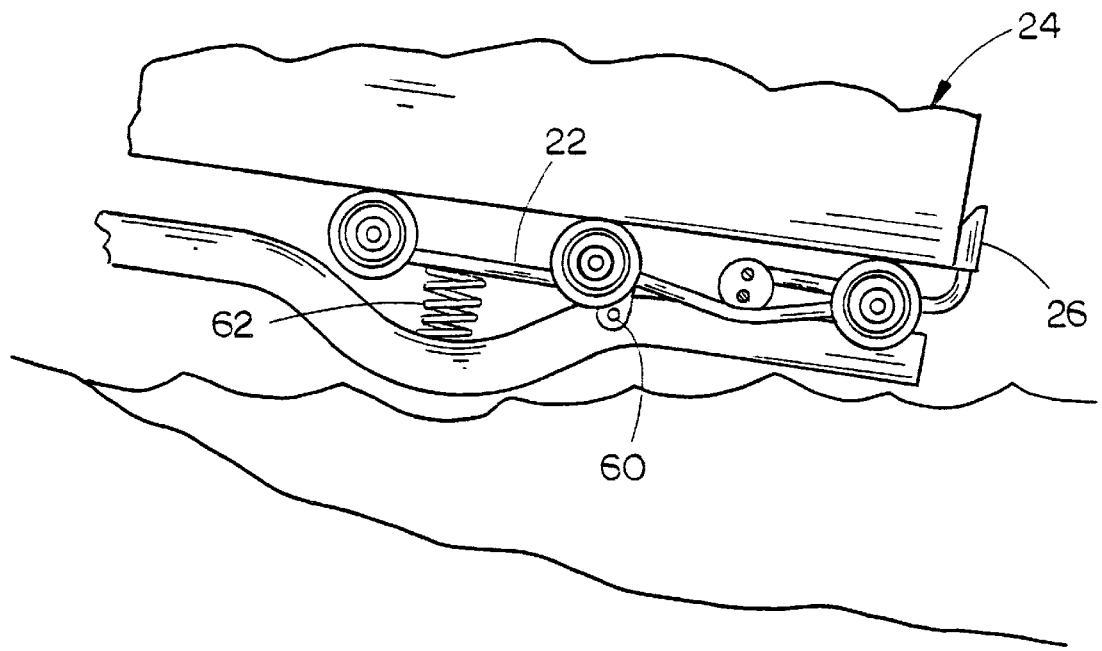
FIG. 8 is a view similar to FIG. 4 except that a spring is utilized in conjunction with a pivotal roller bunk.
Figure 9:
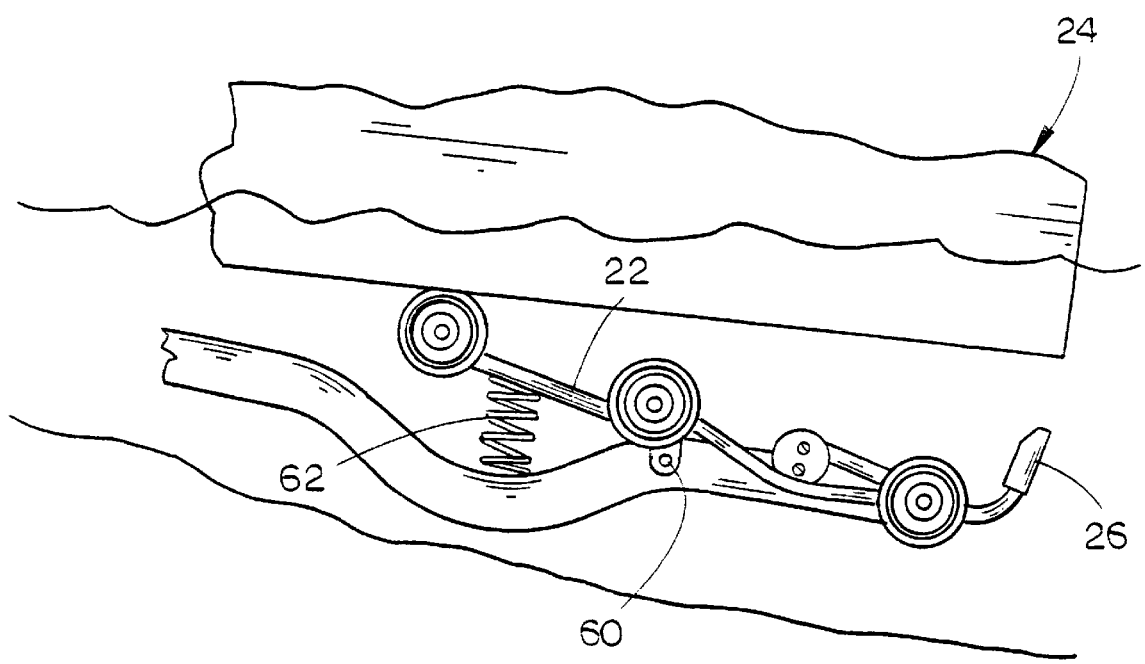
FIG. 9 is a view similar to FIG. 5 except that the embodiment of FIG. 8 is utilized.

To retrieve the boat, the boat trailer is backed into the water to an adequate depth. The boat is powered onto the trailer, and the winch cable is attached to the eye bolt at the front of the boat. Once attached, the boat is winched onto the trailer until the boat is tightly against the forward boat stop 16 on the trailer 10. The trailer and boat are then pulled up the ramp and out of the water. As the trailer and boat are pulled out of the water, the boat settles into position in front of the rear boat stops. The boat stops also serve as a useful launch aid by allowing the winch cable and safety chain to be unhooked from the bow eye of the boat while launching the boat inasmuch as the boat stops prevent the boat from rolling off the trailer during launching. It should also be noted that the boat stops may be removed from the trailer for shallow water boat launching and retrieving. Yet another form of the boat stop is illustrated in FIGS. 8 and 9 and is essentially identical to that illustrated in FIGS. 4 and 5, except that the roller bunks 22 are pivotally connected to the frame of the trailer at 60. Further, a spring 62 is positioned between each of the frame members of the trailer and the forward ends of the associated roller bunks 22 to pivotally move the forward ends of the roller bunks 22 upwardly to help pivotally tilt the roller bunks 22, as illustrated in FIG. 9, which helps buoy the rear of the boat during launching operations, as illustrated in FIG. 9, to lower the boat stop 26 from the position of FIG. 8 to the position of FIG. 9.

Thus it can be seen that a novel boat stop has been provided for a boat trailer which accomplishes at least all of its stated objectives.

I claim:

1. A trailer for a boat having a forward end and an upstanding rearward end, comprising:

a wheeled frame having a forward end and a rearward end;

a hitch at the forward end of said wheeled frame;

boat support means on said wheeled frame for supporting the boat thereon;

and a boat stop permanently rigidly and fixedly mounted on said wheeled frame which is positioned rearwardly of said rearward end of the boat when the boat is positioned on said boat support means to prevent rearward movement of the boat on the trailer.

2. The trailer of claim 1 wherein said boat stop extends upwardly from said wheeled frame means rearwardly of the boat on the trailer.

3. The trailer of claim 2 wherein said boat stop has upper and lower ends and wherein said boat stop has a roller means on its upper end for engaging the upstanding rearward end of the boat.

4. The trailer of claim 2 wherein said boat stop is padded.

5. The trailer of claim 1 wherein said boat support means includes at least a pair of elongated roller bunks which have rearward and forward ends and wherein a boat stop is secured to each of said roller bunks.

6. The trailer of claim 5 wherein said boat stops are secured to the rearward ends of said roller bunks.

7. In combination with a trailer for a boat having a forward end and an upstanding rearward end including upper and lower ends, comprising:

a boat stop rigidly and fixly mounted on the trailer;

said boat stop being mounted on said trailer so as to be positioned rearwardly of the lower end of the rearward end of the boat, when said boat is positioned on the trailer, to prevent rearward movement of the boat on the trailer.

8. The combination of claim 7 wherein at least a pair of boat stops are mounted on the trailer.

9. The combination of claim 7 wherein the trailer includes at least a pair of elongated roller bunks which have rearward and forward ends and wherein a boat stop is secured to each of said roller bunks.

10. The combination of claim 9 wherein said boat stops are secured to the rearward ends of said roller bunks.

11. A trailer for a boat having a forward end and an upstanding rearward end, comprising:

a wheeled frame having a forward end and a rearward end;

a hitch at the forward end of said wheeled frame;

boat support means pivotally mounted on said wheeled frame for supporting the boat thereon, said boat support means including at least a pair of elongated roller bunks which have rearward and forward ends;

a spring means being associated with each of said roller bunks for yieldably and constantly urging the forward end of the associated roller bunk in an upwardly direction; and a boat stop mounted on said rearward ends of each of said roller bunks, said boat stops being positioned rearwardly of said rearward end of the boat when the boat is positioned on said boat support means to prevent rearward movement of the boat on the trailer.

\* \* \* \* \*